United States Patent
Seltborg et al.

(10) Patent No.: US 9,230,696 B2
(45) Date of Patent: Jan. 5, 2016

(54) CONTROL ROD FOR A NUCLEAR POWER LIGHT WATER REACTOR

(75) Inventors: Per Seltborg, Västerås (SE); Lars Hallstadius, Västerås (SE); Björn Rebensdorff, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 166 days.

(21) Appl. No.: 13/696,525

(22) PCT Filed: Apr. 8, 2011

(86) PCT No.: PCT/SE2011/050428
§ 371 (c)(1),
(2), (4) Date: Nov. 6, 2012

(87) PCT Pub. No.: WO2011/139205
PCT Pub. Date: Nov. 10, 2011

(65) Prior Publication Data
US 2013/0051510 A1 Feb. 28, 2013

(30) Foreign Application Priority Data
May 7, 2010 (SE) .................................... 1050455-3

(51) Int. Cl.
*G21C 7/24* (2006.01)
*G21C 7/113* (2006.01)
*G21C 7/117* (2006.01)

(52) U.S. Cl.
CPC *G21C 7/24* (2013.01); *G21C 7/113* (2013.01); *G21C 7/117* (2013.01); *Y02E 30/31* (2013.01); *Y02E 30/32* (2013.01); *Y02E 30/39* (2013.01)

(58) Field of Classification Search
USPC .................................. 376/220, 339, 423, 458
See application file for complete search history.

(56) References Cited

U.S. PATENT DOCUMENTS

| | | | | | |
|---|---|---|---|---|---|
| 3,219,593 | A | * | 11/1965 | Kling et al. | 376/339 |
| 3,462,345 | A | * | 8/1969 | Jabsen | 376/327 |
| 3,515,543 | A | * | 6/1970 | Morton et al. | 376/339 |
| 4,882,123 | A | * | 11/1989 | Cearley et al. | 376/333 |
| 5,180,544 | A | * | 1/1993 | Yoshioka et al. | 376/333 |

(Continued)

FOREIGN PATENT DOCUMENTS

| | | |
|---|---|---|
| GB | 938446 | 10/1963 |
| JP | S58-156884 A | 9/1983 |

(Continued)

OTHER PUBLICATIONS

Masto Ito, et al., "Thermomechanical Properties of Hafnium Hydride", Jounal of Nuclear Science and Technology, vol. 47, No. 2, p. 156-159, Feb. 2010.*

(Continued)

*Primary Examiner* — Jack W Keith
*Assistant Examiner* — Daniel Wasil
(74) *Attorney, Agent, or Firm* — Alston & Bird LLP

(57) ABSTRACT

The invention concerns a control rod configured for a nuclear power light water reactor of the BWR or PWR kind. The control rod contains absorber material. At least 50%, with respect to weight, of the absorber material that is in the control rod is in the form of hafnium hydride. The invention also concerns the use of such a control rod during operation in a nuclear power light water reactor of the BWR or PWR kind.

8 Claims, 1 Drawing Sheet

(56) References Cited

U.S. PATENT DOCUMENTS

| | | | |
|---|---|---|---|
| 5,242,622 A * | 9/1993 | Boutin et al. | 376/339 |
| 5,276,718 A * | 1/1994 | Ueda | 376/339 |
| 5,330,589 A * | 7/1994 | Cheng et al. | 376/339 |
| 5,610,959 A * | 3/1997 | Fecteau et al. | 376/339 |
| 6,137,854 A | 10/2000 | Ueda et al. | |
| 6,470,061 B1 * | 10/2002 | Helmersson | 376/327 |
| 8,000,431 B2 * | 8/2011 | Johnson | 376/412 |
| 8,599,991 B2 * | 12/2013 | Takeda et al. | 376/409 |
| 2007/0227138 A1 | 10/2007 | Carrott | |

FOREIGN PATENT DOCUMENTS

| | | |
|---|---|---|
| JP | S60-027897 A | 2/1985 |
| JP | H02-266293 | 10/1990 |
| JP | H 09-500931 A | 1/1997 |
| JP | 2009/180694 A | 8/2009 |
| WO | WO 94/28185 A1 | 12/1994 |
| WO | WO 00/02205 A1 | 1/2000 |

OTHER PUBLICATIONS

Tsuchiya, B., et al, "Thermal Transport Properties of Hafnium Hydrides and Deuterides," *Journal of Nuclear Materials*, Aug. 2009, vol. 392, No. 3, pp. 464-470, Elsevier BV, The Netherlands.

Abe, K., et al., "A Study of Reactivity Control by Metallic Hydrides for Accelerator Driven System," IAEA International Topical Meeting on Nuclear Research Applications and Utilization of Accelerators, May 4-8, 2009, pp. 1-8, Retrieved from the Internet <http://www-pub.iaea.org/MTCD/publications/PDF/P1433_CD/datasets/papers/ads_p4-15.pdf> Nov. 1, 2012.

International Searching Authority, International Search Report for International Application No. PCT/SE2011/050428, mailed Jul. 18, 2011, 4 pages, European Patent Office, The Netherlands.

International Preliminary Examining Authority, International Preliminary Report on Patentability for International Application No. PCT/SE2011/050428, mailed Aug. 8, 2012, 6 pages, European Patent Office, Germany.

Iwasaki et al., "Development of Hydride Absorber for Fast Reactor—Application of Hafnium Hydride to Control Rod of Large Fast Reactor," Journal of Nuclear Science and Technology, vol. 46, No. 8, p. 874-882 (2009).

Konashi et al., "Development of Advanced Control Rod of Hafnium Hydride for Fast Reactors," Proceedings of ICAPP '06, Reno, NV, USA, Jun. 4-8, 2006, Paper 6368, p. 2213-2217.

Tsuchiya et al., "Correlation between microhardness and electronic charge density of hafnium hydrides," Journal of Alloys and Compounds 489 (2010), p. 685-688.

Japan Patent Office, Notice of Reasons for Rejection for Application No. 2013-509021, Dec. 2, 2014, 5 pages, Japan.

International Research Center for Nuclear Materials Science, "Development Study of Fast Reactor Core with Hydride Neutron Absorber", Kinken Research Highlights 2007, p. 39, Japan.

English translation of JP S60-027897 A to Sumitomo Metal Ind., dated Feb. 12, 1985. (Japanese reference previously submitted.).

European Patent Office, Communication pursuant to Article 94(3) EPC for Application No. 11720610.2, Apr. 20, 2015, 4 pages, Germany.

* cited by examiner

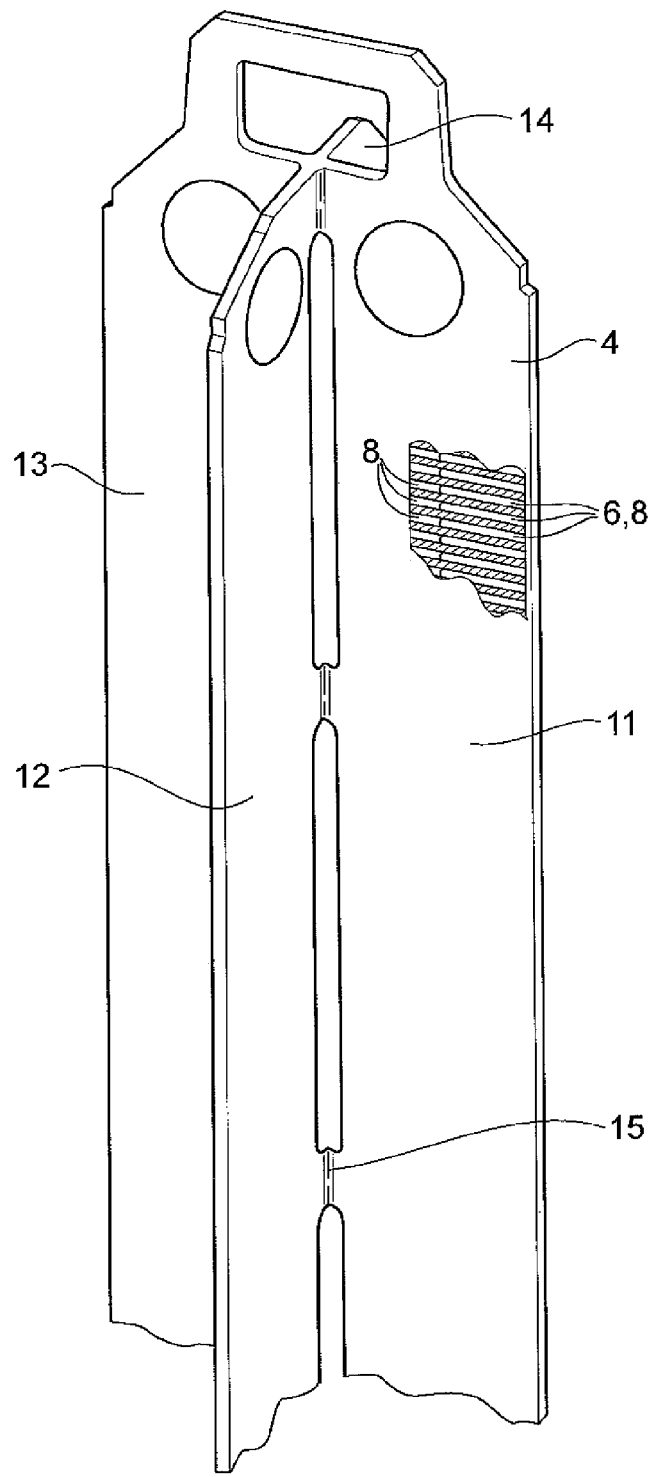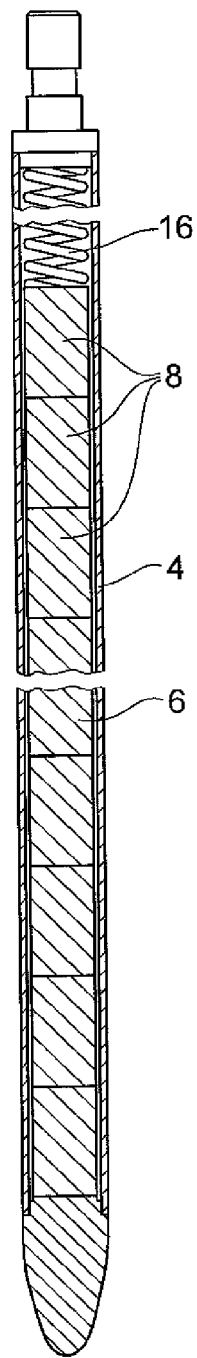
Fig. 1
Fig. 2

CONTROL ROD FOR A NUCLEAR POWER LIGHT WATER REACTOR

CROSS REFERENCE TO RELATED APPLICATIONS

This application is a national stage application, filed under 35 U.S.C. §371, of International Application No. PCT/SE2011/050428, filed Apr. 8, 2011, which claims priority to Swedish Patent Application No. 1050455-3, filed May 7, 2010, both of which are hereby incorporated by reference in their entirety.

BACKGROUND OF THE INVENTION

1. Related Field

The present invention concerns a control rod for a nuclear power light water reactor. The invention also concerns the use of such a control rod.

2. Related Art

In nuclear power light water reactors water is used as neutron moderator. There are two kinds of nuclear power light water reactors, i.e. boiling water reactors, BWR, and pressurized water reactors, PWR. In both kinds of light water reactors some kind of control rods are used for controlling or stopping the nuclear reaction. Such control rods contain a neutron absorbing material. A common neutron absorbing material is boron carbide, $B_4C$. This material is mentioned for example in WO00/002205 A1. Another material that can be used is pure hafnium or hafnium with small additives of other materials. This is described for example in U.S. Pat. No. 5,330,589. It is also known to use control rods that comprise large plates of hafnium. Such control rods usually contain channels for water. For example U.S. Pat. No. 6,137,854 describes control rods with hafnium plates.

The article "Development of Advanced Control Rod of Hafnium Hydride for Fast Reactors" by Konashi at al. in Proceedings of ICAPP '06 Reno, Nev. USA, 4-8 Jun., 2006, pages 2213-2217 does not concern light water reactors but a completely different kind of nuclear power reactors, i.e. so called fast reactors. In a fast reactor the fission reaction is maintained with the help of fast neutrons. Such a reactor does normally not need any neutron moderator. Therefore there is in a fast reactor no water that functions as a neutron moderator. Also the nuclear fuel material that is used in a fast reactor differs from that which is used in a light water reactor. The mentioned article by Konashi et al. describes problems that may arise when using $B_4C$ as absorber material in a control rod in a fast reactor. The article describes that when boron carbide is used, helium gas may be generated, which may lead to the fact that the absorber material swells, which may cause damage on the material that surrounds the absorber material. In order to avoid this problem it is in the article discussed to instead use hafnium as absorber material. It is noted on page 2214 in the article that hafnium has a good absorption capacity for thermal neutrons and that hafnium therefore has been used in light water reactors. The article mentions (page 2214) that there is no experience from using hafnium as absorber material in a fast reactor since the neutron capture capacity of hafnium in a fast reactor is low in comparison with in a light water reactor. The article suggests the use of hafnium hydride as absorber material in a fast reactor since the hafnium hydride has a better neutron absorption capacity than hafnium in a fast reactor since the hafnium hydride also functions as a neutron moderator, i.e. the fast neutrons are slowed down and can therefore be better absorbed.

BRIEF SUMMARY

An object of the present invention is to provide an improved control rod for a light water reactor. An object is thereby to prevent dimensional changes that may occur in the control rod during operation and that thereby may cause disadvantages. Hafnium is, as mentioned above, known as an absorber material in connection with light water reactors. However, the hafnium may pick up hydrogen during use in the light water reactor, i.e. the hafnium is hydrogenated. The hydrogen that is picked up may in particular originate from the water that exist in the light water reactor. The pick up of hydrogen leads to the fact that the dimension of the absorber material may change during operation. This may cause the risk for cracks in the control rod to increase. This may also lead to the creation of tensions such that the control rod will bend. An object of the invention is to avoid such disadvantages. A further object of the invention is to avoid the formation of helium gas, which in particular may take place in control rods that contain boron carbide as absorber material.

Said object are achieved with a control rod according to the present invention. The control rod is configured for a nuclear power light water reactor of the BWR or PWR kind and the control rod contains absorber material. At least 50%, with respect to weight, of the absorber material that is in the control rod is in the form of hafnium hydride.

When it is mentioned that at least 50%, with respect to weight, of the absorber material that is in the control rod is in the form of hafnium hydride, the possibility is included that a certain part of the control rod could contain other absorber material than hafnium hydride. However, at least half of the absorber material that is in the control rod is thus in the form of hafnium hydride.

When it is said that the absorber material "is in the form of hafnium hydride", it is meant either that this material is pure hafnium hydride or, if the material contains other substances, then these substances are only present in the hafnium hydride to a very low extent, less than 5% with respect to weight, preferably less than 1% with respect to weight. Examples of such possible minor additives in the material can be seen for example in the above mentioned U.S. Pat. No. 5,330,589.

Since the absorber material according to the present invention to a large extent consists of hafnium hydride, the risk that the hafnium picks up further hydrogen is reduced. This means that the risk for dimensional changes of the absorber material is reduced. The use of hafnium hydride, instead of for example boron carbide, also means that the formation of helium gas is avoided.

The control rod according to the invention may contain water channels that function as a moderator. This is however not necessary if a sufficient amount of hydrogen is included in the absorber material. Since hydrogen functions as a neutron moderator, the need for water channels in the control rod is avoided, which is a further advantage of the invention.

The hafnium hydride is lighter than hafnium, which brings about the further advantage that the weight of the control rod may be reduced.

A further advantage of the invention is that the lattice structure of hafnium hydride is cubic. Metallic hafnium has a hexagonal lattice structure. A cubic lattice structure is more stable than a hexagonal structure in the neutron flow that is the case in the reactor. This brings about a further advantage, i.e. that the risk for structural changes caused by the neutron flow is reduced.

According to an embodiment of the control rod according to the invention, the ratio between hafnium and hydrogen in the hafnium hydride is $HfH_x$, where x lies within the range from 0.90y to 1.10y, where y is the value of the x that is the case when there is stoichiometric equilibrium in the hafnium hydride with respect to the amount of hydrogen therein during the conditions that are the case during operation in the nuclear power reactor of the kind for which the control rod is configured, i.e. when the control rod is used during operation in a nuclear power reactor.

If the hafnium hydride contains too little hydrogen, then hydrogen, for example originating from water, may be picked up in the material. On the other hand, if the hafnium hydride contains too much hydrogen, then hydrogen, for example in the form of hydrogen gas, may be emitted from the material. By stoichiometric equilibrium is thus in this application meant that none of these two phenomena is the case, or, if they are the case, that they balance out each other. The portion of hydrogen in the hafnium hydride that gives stoichiometric equilibrium may depend on external conditions such as for example the temperature that is the case. Stoichiometric equilibrium is thus in the application defined with respect to the conditions that are the case during operation in the nuclear power reactor for which the control rod is configured.

Since, according to this embodiment, the amount of hydrogen in the hafnium hydride is about the amount for stoichiometric equilibrium, the risk that hydrogen is picked up is reduced. This means thus that the risk for dimensional changes is further reduced. Furthermore, the risk that hydrogen is emitted is reduced. This thus reduces the risk that hydrogen gas is formed. If hydrogen gas is formed, this could mean that a pressure is exerted on the absorber material or on the surrounding material, which could lead to damages.

According to a further embodiment, x=y. This embodiment thus has the advantage that the amount of hydrogen in the material is such that stoichiometric equilibrium is the case.

According to a further embodiment, the ratio between hafnium and hydrogen in the hafnium hydride is $HfH_x$, where $1.40 \leq x \leq 1.80$, preferably it is the case that $1.50 \leq x \leq 1.70$. It has appeared that such an amount of hydrogen in the hafnium hydride is suitable in order to achieve stoichiometric equilibrium during the conditions that normally are the case in nuclear power light water reactors.

According to a further embodiment, the hafnium hydride in the control rod is in the form of solid bodies. Such solid bodies of hafnium hydride function particularly well as absorber bodies.

According to a further embodiment, the solid bodies are at least 1.0 cm long. It is advantageous if the bodies are not too small. The bodies may with advantage be at least 3.0 cm long, for example at least 5.0 cm long, in particular in a control rod for a BWR.

According to a further embodiment, the solid bodies have been formed from hafnium hydride in powder form. It has appeared advantageous that the bodies are formed by hafnium hydride in powder form. Such bodies can be formed for example by sintering or by hot isostatic pressing (HIP).

According to another embodiment, the hafnium hydride in the control rod is in powder form. As an alternative to said bodies, the hafnium hydride may thus be in powder form. This may simplify the method of production, since no solid bodies need to be formed.

According to a further embodiment, the control rod comprises a casing within which there is at least one space for the absorber material, wherein said absorber material in the form of hafnium hydride is in said at least one space. Since the hafnium hydride has less mechanical stability than pure metallic hafnium, the hafnium hydride is suitably arranged in a casing that provides sufficient mechanical stability.

According to a further embodiment, said at least one space is configured as an elongated channel with substantially circular cross-section. In such elongated channels a sufficient and well defined amount of hafnium hydride may with advantage be arranged.

According to a further embodiment, said absorber material in the form of hafnium hydride is in the form of one or more solid bodies with substantially circular cross-section, wherein the solid body or the solid bodies have a cross-sectional diameter d and wherein the space has a cross-sectional diameter D where the solid body or the solid bodies are positioned and have a cross-sectional diameter d, wherein $D-d \leq 0.20$ mm, preferably $\leq 0.10$ mm. Since the body in the form of hafnium hydride does not substantially expand during use, substantially no expansion space is needed, which otherwise is necessary when the absorber body for example is made of $B_4C$. Preferably D is constant over the whole length of the space and d is constant over the whole length of the body.

According to a further embodiment, the control rod is configured for a BWR. The absorber material in the form of hafnium hydride may be used in a PWR but it is particularly advantageous to use the material in a BWR.

According to a further embodiment, the control rod has a cruciform cross-section and consists of four control rod blades that meet in the centre of the cross, wherein each control rod blade comprises a plurality of elongated spaces for absorber material and wherein said absorber material in the form of hafnium hydride is arranged in said spaces. Such a cruciform control rod is suitable to be used in a BWR. It is thereby advantageous to arrange the absorber material in channels in the control rod blades. The channels may either extend in the longitudinal direction of the control rod or in a radial direction.

According to a further embodiment, each of a plurality of the elongated spaces has a length L, wherein in each of these spaces said absorber material in the form of hafnium hydride is in the form of a solid body with the length l, wherein $L-l \leq 2.0$ mm, preferably $\leq 1.0$ mm. Since the body in the form of hafnium hydride substantially does not expand during use, it is also in the longitudinal direction no need for any substantial expansion space.

According to a further embodiment, at least 90%, with respect to weight, of the absorber material that is in the control rod is in the form of hafnium hydride. It is advantageous if hafnium hydride is used as absorber material in the major part of the control rod. The invention does not exclude the possibility that some other absorber material is used in a certain part of the control rod. However, it is advantageous if at least 90% of the absorber material that is used in the control rod is in the form of hafnium hydride. According to an advantageous embodiment, all absorber material in the control rod is in the form of hafnium hydride.

Another object of the invention is to achieve, as compared with the prior art, an improved operation of a nuclear power light water reactor of the BWR or the PWR kind.

This object is achieved in that a control rod according to any of the previous embodiments is used as control rod during operation in a nuclear power light water reactor of the BWR or the PWR kind.

By using such a control rod, the advantages that have been described above in connection with the control rod are achieved.

According to a particularly advantageous use of the control rod, the nuclear power light water reactor in which it is used is of the BWR kind.

BRIEF DESCRIPTION OF THE FIGURES

FIG. 1 shows schematically a perspective view of a part of a control rod for a BWR.

FIG. 2 shows schematically a cross-section of a control rod for a PWR.

DETAILED DESCRIPTION OF THE VARIOUS EMBODIMENTS

FIG. 1 thus schematically shows a control rod for a BWR. The control rod comprises a casing 4. The casing may for example consist of stainless steel. The casing 4 is configured such that the control rod has four control rod blades 11, 12, 13, 14 arranged such that the control rod has a cruciform cross-section. The control rod blades 11, 12, 13, 14 meet in the centre 15 of the cross. Each control rod blade 11, 12, 13, 14 comprises a plurality of spaces 6 for absorber material. In FIG. 1 some such spaces 6 in the control rod blade 11 are schematically shown.

According to this embodiment, each space 6 is configured as an elongated channel that extends in the radial direction in the control rod blade 11. The channel 6 may have a circular cross-section. In the channels 6 absorber material 8 is arranged. The absorber material 8 has the purpose of absorbing neutrons.

According to the present invention, the absorber material 8 is in the form of hafnium hydride. The control rod may also comprise other absorber material 8 than hafnium hydride. However, according to the invention it is preferred that the absorber material 8 for the most part consists of hafnium hydride. Preferably all absorber material 8 in the control rod is in the form of hafnium hydride. The hafnium hydride may however contain small amounts of additives. The amount of hydrogen in the hafnium hydride is such that substantially stoichiometric equilibrium is the case during the conditions that are the case in the nuclear power reactor for which the control rod is configured. The hafnium hydride may thereby be in the form of $HfH_{1.6}$.

The hafnium hydride may be arranged in powder form in the channels 6. According to an advantageous embodiment, the hafnium hydride is however in the form of solid bodies 8 in the channels 6. Such solid bodies may have been formed from hafnium hydride powder. The bodies can for example be formed by hot isostatic pressing (HIP) and/or by sintering. The bodies 8 may for example be formed in a similar manner as that in which absorber bodies of $B_4C$ are formed. The bodies may for example be 5 cm long, according to an advantageous embodiment, the bodies 8 may be so long that they extend over substantially the whole length of the channel 6. If for example the elongated spaces 6 have a length L and the absorber material 8 in the form of hafnium hydride is in the form of a solid body with the length l, then it may be the case that L–l≤2.0 mm, for example L–l may be 1 mm. L may for example be 10 cm.

FIG. 2 shows schematically a cross-section through a control rod for a light water reactor of the PWR kind. The control rod has in this case a cylinder-shaped casing 4 that for example is made of stainless steel. Within the casing there is a channel 6. In the channel 6 there is absorber material 8. The absorber material 8 consists for the most part of hafnium hydride. Preferably all absorber material 8 in the control rod is in the form of hafnium hydride. The hafnium hydride may however contain certain smaller additives of other substances. The hafnium hydride may be in powder form. However, it is advantageous if the hafnium hydride is in the form of solid bodies 8. Such solid bodies 8 may for example be 1.5 cm long and may have a circular cross-section. The bodies may be formed from a powder in a similar manner to that which has been described above in connection with FIG. 1. The control rod according to FIG. 2 contains a spring 16 in order to hold the bodies 8 secured in position.

Both in the case of a control rod for a BWR (FIG. 1) and in the case of a control rod for a PWR (FIG. 2), the absorber material 8 in the form of hafnium hydride may be in the form of one or more solid bodies with a substantially circular cross-section. The solid body or the solid bodies may have a cross-sectional diameter d and the space in the control rod may have a cross-sectional diameter D where the solid body or the solid bodies are positioned and have the cross-sectional diameter d. Thereby, suitably D–d≤0.20 mm. D–d may for example be 0.10 mm.

Also in the embodiment according to FIG. 2, the hafnium hydride suitably contains such an amount of hydrogen that stoichiometric equilibrium is the case during the conditions that are the case during operation in the nuclear power reactor for which the control rod is configured. The hafnium hydride may hereby for example be $HfH_{1.6}$.

Another aspect of the invention concerns the use of a control rod in a nuclear power light water reactor. According to such a use, a control rod of the kind which has been described in connection with FIG. 1 may be used as a control rod during operation in a BWR. Preferably, a plurality of such control rods are used in the BWR.

According to another use according to the invention, a control rod of the kind which has been described in connection with FIG. 2 is used as a control rod during operation in a nuclear power light water reactor of the PWR kind. Preferably a plurality of such control rods are used in the PWR.

With the control rods and the uses according to the invention, the advantages that have been described above are achieved.

The invention is not limited to the described embodiments but can be varied and modified within the scope of the following claims.

The invention claimed is:

1. Control rod configured for at least one of a nuclear power light water boiling water reactor or a nuclear power light water pressurized water reactor, wherein the control rod comprises a casing (4) within which there is at least one space (6), wherein the control rod contains neutron absorber material (8) in said at least one space (6), wherein at least 90%, with respect to weight, of the neutron absorber material (8) that is in said at least one space (6) of said control rod is in the form of hafnium hydride, wherein the ratio between hafnium and hydrogen in said hafnium hydride is $HfH_x$, where 1.40≤x≤1.80, wherein the hafnium hydride in the control rod is in the form of solid bodies (8), wherein said at least one space (6) is configured as an elongated channel with substantially circular cross-section, and wherein said neutron absorber material (8) in the form of hafnium hydride is in the form of one or more solid bodies with substantially circular cross-section, wherein the solid body or each of the solid bodies have a cross-sectional diameter d, and wherein the space has a cross-sectional diameter D where the solid body or each of the solid bodies are positioned, wherein D–d≤0.20 mm.

2. The control according to claim 1, wherein the solid bodies (8) are at least 1.0 cm long.

3. The control rod according to claim 1, wherein the solid bodies (8) have been formed from hafnium hydride in powder form.

4. Control rod configured for at least one of a nuclear power light water boiling water reactor or a nuclear power light water pressurized water reactor, wherein the control rod comprises a casing (4) within which there is at least one space (6), wherein the control rod contains neutron absorber material (8) in said at least one space (6), wherein at least 90%, with respect to weight, of the neutron absorber material (8) that is in said at least one space (6) of said control rod is in the form of hafnium hydride, wherein the ratio between hafnium and hydrogen in said hafnium hydride is $HfH_x$, where $1.40 \leq x \leq 1.80$, wherein the hafnium hydride in the control rod is in the form of solid bodies (8), wherein the control rod is configured for a boiling water reactor, wherein the control rod has a cruciform cross-section so as to define a cross, wherein the control rod consists of four control rod blades (11, 12, 13, 14) that meet in the centre (15) of the cross, wherein each control rod blade (11, 12, 13, 14) comprises a plurality of elongated spaces (6) for absorber material and wherein said absorber material in the form of hafnium hydride is arranged in said elongated spaces (6), and wherein each of the plurality of the elongated spaces (6) has a length L, wherein in each of these spaces said absorber material (8) in the form of hafnium hydride is in the form of a solid body with a length l, wherein $L-l \leq 2.0$ mm.

5. A method of using of a control rod configured for at least one of a nuclear power light water boiling water reactor or a nuclear power light water pressurized water reactor, said method comprising the steps of:
providing said control rod, wherein the control rod comprises:
a casing (4) within which there is at least one space (6); and
a neutron absorber material (8) in said at least one space (6), wherein at least 90%, with respect to weight, of the neutron absorber material (8) that is in said at least one space (6) of said control rod is in the form of hafnium hydride, wherein the ratio between hafnium and hydrogen in said hafnium hydride is $HfH_x$, where $1.40 \leq x \leq 1.80$,
wherein the hafnium hydride in the control rod is in the form of solid bodies (8), wherein said at least one space (6) is configured as an elongated channel with substantially circular cross-section, and wherein said neutron absorber material (8) in the form of hafnium hydride is in the form of one or more solid bodies with substantially circular cross-section, wherein the solid body or each of the solid bodies have a cross-sectional diameter d, and wherein the space has a cross-sectional diameter D where the solid body or each of the solid bodies are positioned, wherein $D-d \leq 0.20$ mm; and
at least one of controlling or stopping, via said control rod, a nuclear reaction occurring in and during operation of said nuclear power light water boiling water reactor or said nuclear power light water pressurized water reactor.

6. The method according to claim 5, wherein:
during the step of providing said control rod, a value of x in $HfH_x$ is selected so as to provide a stoichiometric equilibrium in said hafnium hydride with respect to the amount of hydrogen therein during conditions that exist during said operation of said nuclear power light water boiling water reactor or said nuclear power light water pressurized water reactor.

7. A method of using of a control rod, said method comprising the steps of:
providing said control rod, wherein the control rod comprises:
a casing (4) within which there is at least one space (6); and
a neutron absorber material (8) in said at least one space (6), wherein at least 90%, with respect to weight, of the neutron absorber material (8) that is in said at least one space (6) of said control rod is in the form of hafnium hydride, wherein the ratio between hafnium and hydrogen in said hafnium hydride is $HfH_x$, where $1.40 \leq x \leq 1.80$, wherein the hafnium hydride in the control rod is in the form of solid bodies (8), wherein the control rod is configured for a nuclear power light water boiling water reactor, wherein the control rod has a cruciform cross-section so as to define a cross, wherein the control rod consists of four control rod blades (11, 12, 13, 14) that meet in the centre (15) of the cross, wherein each control rod blade (11, 12, 13, 14) comprises a plurality of elongated spaces (6) for absorber material and wherein said absorber material in the form of hafnium hydride is arranged in said elongated spaces (6), and wherein each of the plurality of the elongated spaces (6) has a length L, wherein in each of these spaces said absorber material (8) in the form of hafnium hydride is in the form of a solid body with a length l, wherein $L-l \leq 2.0$ mm; and
at least one of controlling or stopping, via said control rod, a nuclear reaction occurring in and during operation of said nuclear power light water boiling water reactor.

8. The method according to claim 7, wherein:
during the step of providing said control rod, a value of x in $HfH_x$ is selected so as to provide a stoichiometric equilibrium in said hafnium hydride with respect to the amount of hydrogen therein during conditions that exist during said operation of said nuclear power light water boiling water reactor.

\* \* \* \* \*